Figure 1:
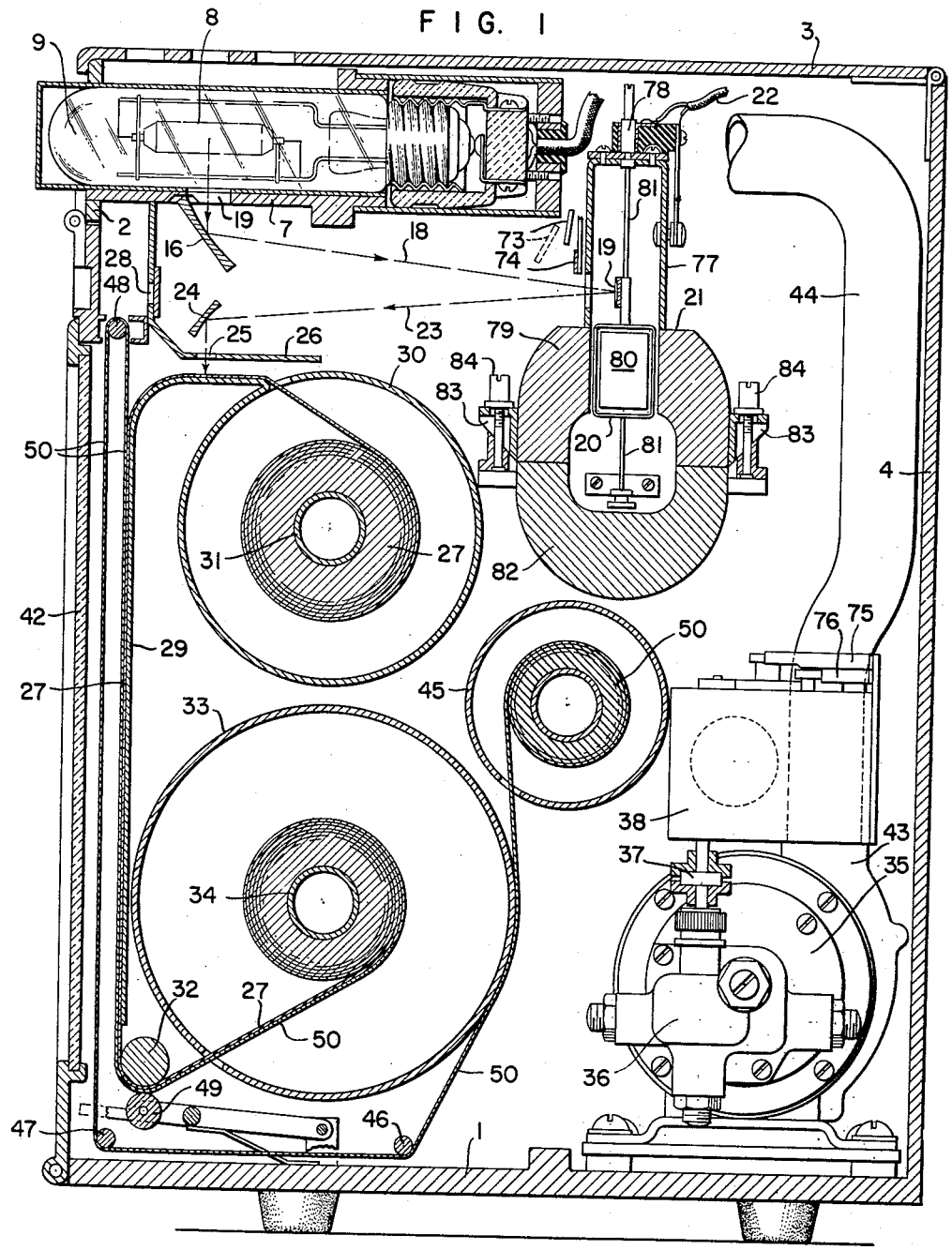

Nov. 13, 1962

C. A. HEILAND 3,064,260

RECORDING SYSTEM

Filed Dec. 26, 1952

3 Sheets-Sheet 1

INVENTOR.
CARL A. HEILAND

BY

*Arthur H. Swanson*

ATTORNEY.

Nov. 13, 1962

C. A. HEILAND 3,064,260

RECORDING SYSTEM

Filed Dec. 26, 1952

3 Sheets-Sheet 3

INVENTOR.
CARL A. HEILAND

BY

ATTORNEY.

United States Patent Office 3,064,260
Patented Nov. 13, 1962

3,064,260
RECORDING SYSTEM
Carl A. Heiland, Golden, Colo., assignor, by mesne assignments, to Minneapolis-Honeywell Regulator Company, Minneapolis, Minn., a corporation of Delaware
Filed Dec. 26, 1952, Ser. No. 327,989
1 Claim. (Cl. 346—109)

This invention relates to improvements in recording systems of the nature disclosed in my United States Patent No. 2,580,427, dated January 1, 1952.

The recording system described in the patent referred to, makes use of beams of substantially invisible radiations to produce immediately visible oscillographic records. The reasoning leading to the development of this method is based essentially on three considerations:

(1) In mechanical or pen-type recorders a certain amount of energy must be supplied to the pen tip or writing arm to produce a visible record. This energy may take the form of mechanical pressure for scratching, inking, intermittent dotting, or printing; or it may be conveyed in the form of electricity to produce spark records, electrochemical color changes, or heated-wire-traces. All of this limits the frequency or sensitivity of the recording device or both.

(2) The energy required for the production of a trace is substantially reduced in photographic recording methods and devices where the mechanical pointer is replaced by a light (or electron) beam, but additional energy must be conveyed to the record in the form of photochemical reactions (developing and fixing) to make the trace visible.

(3) Energy requirements in any oscillatory system, be it mechanical, electronic, electromagnetic or molecular, are at a minimum, and maximum effects are produced, at the point of resonance. As applied to optical recording, this means that if the source and recording medium can be matched to one another relative to wave length of the emission and reaction respectively, the intensity of the recording spot may be sufficient to produce an immediately visible trace.

In the patent referred to above, it was shown that the invisible regions of the spectrum are most suitable for this purpose. In the ultra-violet region, the band between .3 and .4 micron has been found to be most effective. In the infrared, the band between .8 and 1.5 microns has produced good results.

It was also shown in said Patent No. 2,580,427 that, in the practical application of this recording method, it is necessary to provide filters in order to keep environmental (ambient) radiations of the same or similar wave lengths as those used for recording, from discoloring or otherwise affecting the record. The quantitative aspects of the filter situation which apply in this connection were illustrated in FIGURE 18 of said patent. In the recording apparatus there described, a stationary filter is permanently mounted in front of the part of the recording sheet exposed to view.

It is the purpose of the present invention to provide three novel filter arrangements which are, or become a part of, the recording sheet and move with the same while the apparatus is in operation, instead of being physically separated from it and remaining stationary. The filtering and recording methods described herein are equally applicable to both invisible regions of the spectrum, namely, the ultra-violet and the infrared.

The objects of the present invention are apparent from three methods of accomplishing the desired filtering effects hereinafter described which are as follows:

(a) A method providing for a filter in solid form which is rolled on and becomes a part of the recording sheet.

(b) A method providing for application of the filtering substance in liquid form; i.e., in the form of a coating which dries by the time the recording sheet is coiled up in the take-up magazine.

(c) A method in which the filter substance in solid or liquid form is applied beforehand, and the recording sheet provided with such a layer proceeds from the supply magazine to the take-up magazine, with the filter substance facing the opening provided for viewing, while the record or trace is produced by irradiation with substantially invisible rays from the back of the recording sheet.

Figure 2:
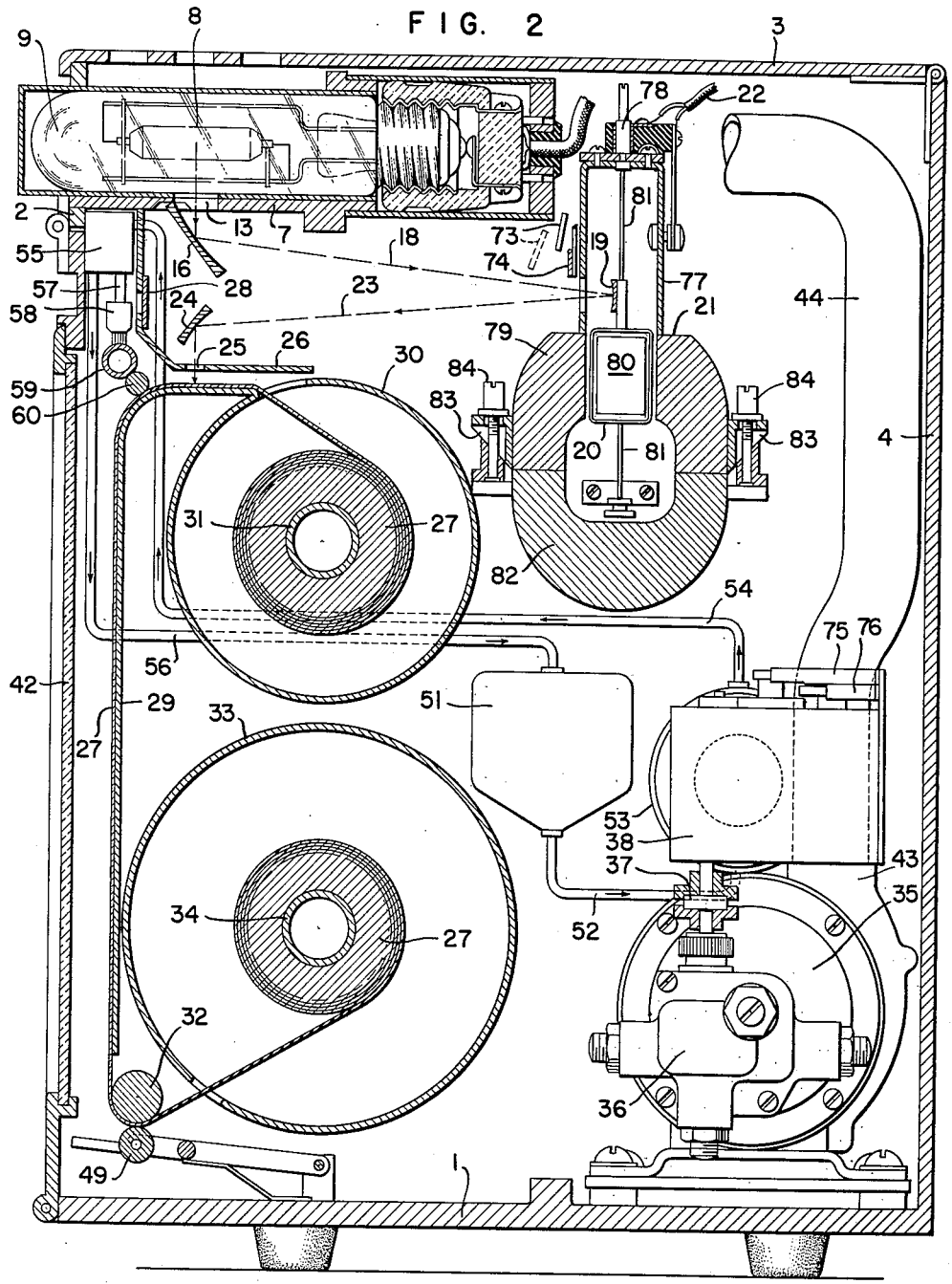
Figure 3:
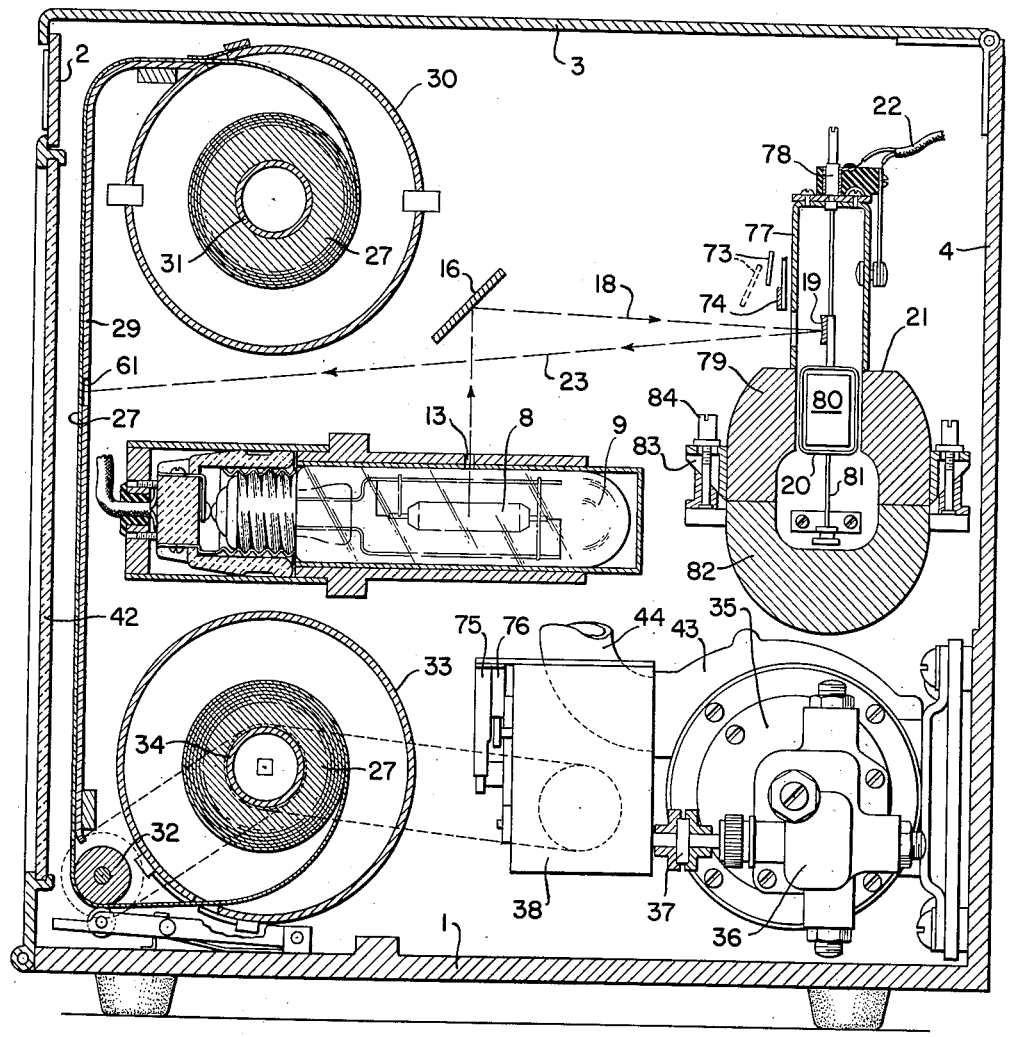

These and other objects and characteristics of the invention will appear more fully hereinafter and the nature of the invention will be understood from the following specifications taken with the accompanying drawings in which three embodiments of an apparatus capable of carrying out the improved recording method are illustrated. In the drawings, FIGURE 1 is a schematically vertical section indicating the arrangement of an auxiliary supply magazine and drive mechanism for applying the filter in solid form;

FIG. 2 is a schematically vertical section showing an arrangement for applying the filter-substance in liquid form; and FIG. 3 is a schematically vertical section showing a re-arrangement of the optical system and magazines for recording through the back of the sheet, with the previously applied filter on the recording sheet facing the opening.

As shown in FIGURES 1 and 2, the recording apparatus consists of a case 1, 2, 3, 4 in which is contained a chamber 5, 6, 7 which may be swung outside of the case. In this chamber is located a source of radiation, represented in this case by a mercury vapor lamp 8 in a quartz glass envelope 9. The radiation transmited by this source passes through the slit 13 and impinges upon the concave surface of the projection mirror 16 which is rotatable about a horizontal axis. The drawings show the radiation path schematically for but one galvanometer but it is possible to use a plurality of galvanometers with one or several sources of radiation.

After being reflected from the projection mirror 16, the ray goes along the path 18 to the concave surface of a cylindrical oscillograph mirror 19 which is fastened to the axis of rotation of the coil 20. The oscillograph elements 21 are connected by means of individual leads 22 with such generators as strain gauges, thermocouples, amplifiers, and the like. The mirrors 19 oscillate about vertical axes in proportion to the applied current variations. Therefore, the return rays 23 reflected from the mirrors oscillate in the same manner and impinge upon the cylindrical concave mirror 24 which is adjustable about a horizontal axis. The radiations reflected from mirror 24 go downward along line 25 through an opening in plate 26 and impinge upon the recording medium 27 which may be a film or paper. A portion of the return rays may be used for visual observation on the screen or scale 28. The recording paper 27 upon which the traces projected by the galvanometer mirrors appear runs downward on the surface of the guide plate 29.

The recording medium is furnished by the magazine 30 containing the roll 31, is driven by the roller 32 into the magazine 33, and is coiled up on the take-up drum 34. The drive mechanism is indicated schematically by the electric motor 35, the speed reducer 36, the coupling 37, and the transmission 38. The transmission 38 contains a shift mechanism which makes it possible to change the paper speed from inches per minute to inches per hour. The reverse end of the motor carries a blower 43 supplying cool air to the source of radiation 8, 9 through the tubing 44. If the recording sheet is suitably protected, as described herein, it may be inspected in daylight through the window 42 and may be utilized further without fear of discoloration after withdrawal from the magazine 33.

FIGURE 1 illustrates how a protective layer may be applied in the form of a film, and FIGURE 2 shows how it may be applied in liquid form. The cover-layer in the form of cellophane film 50 (FIG. 1) comes off the spool 45, travels downward and is smoothed out by the outside of the magazine 33, then travels horizontally across the rollers 46, 47 and turns upwards in a vertical direction behind the window 42. By means of the spring-suspended roller 48, the film is brought in uniform contact with the recording paper 27 and adheres thereto so that both together arrive at the roller 32 where both layers are again pressed together by the idler 49. The color of the cellophane film is selected in such a manner as to affect the proper absorption of the radiation upon which the paper reacts. The lower magazine 33 has a larger diameter than the upper magazine because of the greater thickness of the coated recording paper.

The cover-layer may also be applied in liquid form as a rapidly drying lacquer of suitable color which is stored in the reservoir 51 (FIG. 2). From this reservoir the liquid is drawn through the line 52 into a pump 53 fastened to the rear portion of the transmission 38. From the pump the liquid is forced under pressure into the line 54 and into another reservoir 55 which is kept filled and under pressure at all times. The excess liquid flows back into the reservoir 51 through the line 56. The reservoir 55 is connected by the lateral lines 57 with the brush chamber 58 which transfers the lacquer upon the intermediate roller 59, and from there to the transfer roller 60. The roller 60 makes light contact with the recording paper 27 whereby a coating of uniform thickness is applied thereto, which coating has dried on arrival at the roller 32.

Time marks may be produced by an electromagnetically actuated shutter 73 indicated schematically in FIGURES 1 and 2. This shutter exposes the mirror 74 to the radiation whereby a fine line is transversely projected on the paper by means of the concave mirror 24. The shutter is actuated by two contacts 75, 76 which are connected to the drive 38, whereby it is possible to project a given number of time marks per minute, or a given number of time marks per hour, by changing a switch.

The galvanometer shown in FIGURES 1, 2 and 3 consists of the case 77, the torsion head 78, the pole pieces 79, the armature 80, the coils 20 suspended by ribbons 81, the permanent magnets 82, and the brackets 83 affixed to the pole pieces 79. These brackets are so curved on their lower bearing surfaces that the center of curvature coincides with the center of the galvanometer mirror 19. By manipulating the nuts 84, the galvanometer may be so adjusted in a vertical plane that the return ray 23 is reflected correctly upon the concave mirror 24 by all of the galvanometers.

The essence of this galvanometer construction is a small transverse dimension in comparison to the width of the galvanometer in the direction of the incident and reflected radiation. This is accomplished by a parallel arrangement of the magnetic fields so that all north poles point toward the front, and all south poles toward the back of the camera. In this manner all coil surfaces are parallel and all mirrors are located in the same plane the but at right angles to the coil plane.

With particular reference to FIGURE 3, it is noted that the supply magazine 31 now contains the recording sheet 27 with the filtering substance previously applied to it in liquid or solid form so that both move as one over the apron 29 which now has an opening 61 to admit the radiation impinging upon it from the rear. The optical system, or projection system, is now different from that appearing in FIGURES 1 and 2 in that the radiation source is now located below rather than above the supply magazine. Many of the features are designated as before, including the source 8, the incident beam 18, the galvanometer mirror 19 and the reflected beam 23. In this particular arrangement there is no need for the cylindrical mirror 24 and the radiation beam is focused directly upon the back of the recording sheet. However, if the optical system were turned so that the beams 18 and 23 were essentially vertical instead of horizontal, as shown here by way of example, the cylindrical mirror would again be required.

The arrangements described schematically in the drawings are equally applicable to the ultraviolet and the infrared regions of the spectrum. In order to protect the record from the ultraviolet radiations contained in the daylight used for viewing the record, the color of the filter sheet or filter coating is preferably orange or light red. For the infrared, either a heat absorbing, or a heat reflecting, coating may be used. If a heat absorbing layer is applied, its color would preferably be a light green; if it is heat reflecting, its color would be white.

With particular reference to the back sheet recording method illustrated in FIGURE 3, the recording sheet in the ultraviolet application would consist of three constituent parts; namely (proceeding from the back of the sheet toward the front), a paper base, an ultraviolet-sensitive coating, and a filter coating. In the preferred form of the infrared application with a heat reflecting coating the constituent parts of the recording medium may be reduced to two; namely, a black base which serves to convert the impinging infrared radiation to heat, and a white coating which serves two purposes: (1) to reflect the environmental infrared, and (2) to evaporate under the influence of the heat generated in the base by the impinging infrared radiation, thereby exposing the base in the form of a black trace.

This construction of the recording sheet for the infrared, i.e., a sheet consisting of but two constituent parts, suggests the same procedure for the ultraviolet, namely: a sheet consisting of a base acting as a filter and facing the viewer, with a coating facing the galvanometer and exposed to the impinging radiation beam. The base material may be film or paper of red or orange color, and the coating an emulsion or the like, sensitized for the ultraviolet. In either case, the back-sheet recording system indicated in FIG. 3 is the same.

Although certain forms of the invention have been shown and described by way of illustration, it will be understood that it may be constructed in various other embodiments coming within the scope of the appended claim.

I claim:

In apparatus for recording the time-variations of phenomena, a source of invisible radiations which transmits a maximum of energy in the ultra-violet wavelengths, a galvanometer having a coil responsive to said time-variations, a mirror movable with said coil to reflect said radiations and cause them to move as a pointer upon movements of said coil, and a recording medium consisting of two constituent parts, a transparent base impervious to ultra-violet radiation located at the side facing the viewer during the recording operation, and an ultra-violet-sensitive coating on and in contact with the base and facing the mirror so that the radiations from said source are reflected by said mirror and impinge on the ultra-violet-sensitive coating to produce an immediately visible and permanent trace in said sensitive coating, said base providing a filter shielding the ultraviolet-sensitive coating against undesired environmental and extraneous radiations.

References Cited in the file of this patent

UNITED STATES PATENTS

| | | |
|---|---|---|
| Re. 24,554 | Clark et al. | Oct. 21, 1958 |
| 1,700,656 | Tillyer | Jan. 29, 1929 |
| 1,765,944 | Seel | June 24, 1930 |
| 1,783,442 | Mayer et al. | Dec. 2, 1930 |
| 1,921,050 | Thornton | Aug. 8, 1933 |
| 1,972,424 | Mediger | Sept. 4, 1934 |
| 2,036,442 | Tanatar | Apr. 7, 1936 |
| 2,221,776 | Carlson | Nov. 19, 1940 |
| 2,337,534 | Barber | Dec. 28, 1943 |
| 2,352,077 | Clough | June 20, 1944 |
| 2,386,855 | Horback | Oct. 16, 1945 |
| 2,535,065 | Heiland | Dec. 26, 1950 |
| 2,546,724 | Coe | Mar. 27, 1951 |
| 2,635,034 | Haviland | Apr. 14, 1953 |
| 2,668,126 | Taylor et al. | Feb. 2, 1954 |
| 2,747,996 | Edgerton et al. | May 29, 1956 |

FOREIGN PATENTS

| | | |
|---|---|---|
| 471,366 | Great Britain | Sept. 2, 1937 |

OTHER REFERENCES

Murray, "Recording Paper", Serial No. 790,115, Abstract published in Vol. 652, page 617, of the Official Gazette on November 13, 1951.

Clark: "Photography by Infrared", Second Edition, 1946, published by John Wiley and Sons, Inc., New York, page 116.